United States Patent [19]

Fleming et al.

[11] Patent Number: 5,140,677
[45] Date of Patent: Aug. 18, 1992

[54] COMPUTER USER INTERFACE WITH WINDOW TITLE BAR MINI-ICONS

[75] Inventors: S. S. Fleming, Irving; R. J. Torres, Colleyville; P. J. Keane, Grapevine, all of Tex.; A. C. C. Temple, Hellidon, United Kingdom

[73] Assignee: International Business Machines Corporation, Armonk, N.Y.

[21] Appl. No.: 522,300

[22] Filed: May 11, 1990

[51] Int. Cl.⁵ .............................................. G06F 3/14
[52] U.S. Cl. .................................... 395/159; 395/157
[58] Field of Search ..................... 395/159, 157, 158; 340/734, 721

[56] References Cited

U.S. PATENT DOCUMENTS 4,899,136 2/1990 Beard et al. ....................... 340/706

Primary Examiner—David L. Clark
Attorney, Agent, or Firm—Jonathan E. Jobe, Jr.

[57] ABSTRACT

Disclosed is a computer system user interface that includes an application or object window with a mini-icon representing the application or object. The mini-icon is available for use in direct manipulation and context menu operations while the window is open.

16 Claims, 4 Drawing Sheets

COMPUTER USER INTERFACE WITH WINDOW TITLE BAR MINI-ICONS

BACKGROUND OF THE INVENTION

1. Field of The Invention

The present invention relates generally to computer system user interfaces, and more particularly to a windowed computer system user interface that includes a mini-icon in the window title bar.

2. Description of The Prior Art

Conventional systems provide icons to represent objects. These icons may be directly manipulated to perform useful tasks. For example, an icon for a document may be dragged to a printer to print the document. Context menus may also be used to perform tasks with icons. A context menu is a list of actions presented near the indicated object. Context menus are also referred to as pop-up menus in the industry.

Icons may also be opened to create a window within which a portion of the object is depicted. For example, opening the icon for a document depicts a portion of the document on the computer screen within the window's frame. The user can then work with the document and then make changes if desired. Conventional systems provide support for users to work on several tasks on a single workstation.

Often a user may wish to perform some task via direct manipulation or via a context menu on an object he/she has opened in a window. For example, a user may be editing a document in a window and wish to print the current rough draft of the document. Direct manipulation and context menu techniques for this action require that the object's icons be visible.

However, when the user opens an object in a window to work with it, often the object's icon is hidden by the newly created window. The icon may also be hidden due to the subsequent repositioning, scrolling or resizing of windows on the computer screen. An icon can also be hidden if the window displaying the icon is closed. In all of these cases, although the window opened from the icon is visible, the icon is hidden and therefore cannot be used for tasks involving techniques such as direct manipulation or context menus.

For certain tasks, techniques such as action bar pull-downs may provide alternate methods of accomplishing a task for certain application windows. One disadvantage of this approach is that it typically does not follow the object-action paradigm normally used by the action bar. That is, normally an action bar action affects the object selected in the window. For example, some current applications use the print action to print the entire document, rather than just selected text. This approach presents problems when users wish to print just the selected portion of the document. For example, a user may have a chart imbedded in a document and wish to print only the chart and not the entire document. Another example might be a user who wishes to print only selected pages of a document. This is not possible if the print action has already been used to print the entire document, ignoring selections.

SUMMARY OF THE INVENTION

In the present invention, an icon that is directly manipulable is positioned in the window for the object that is represented by that icon. In the preferred embodiment, the icon is a small "mini-icon" that is placed within the unused area of the window. Preferably, the mini-icon is placed on the window title bar and not the client area of the window. Thus, the mini-icon does not scroll out of view. However, the mini-icon is active in the sense that it may be used in direct manipulation operations in which it is either a source or target of such operations. The mini-icon is used as a source when it is dragged to another object. For example, dragging a document's mini-icon to a printer results in printing the document. The mini-icon is used as a target when another object is dropped on it. For example, dragging a document to a folder's mini-icon results in moving or copying that document into that folder.

DESCRIPTION OF THE PREFERRED EMBODIMENT

Figure 1:
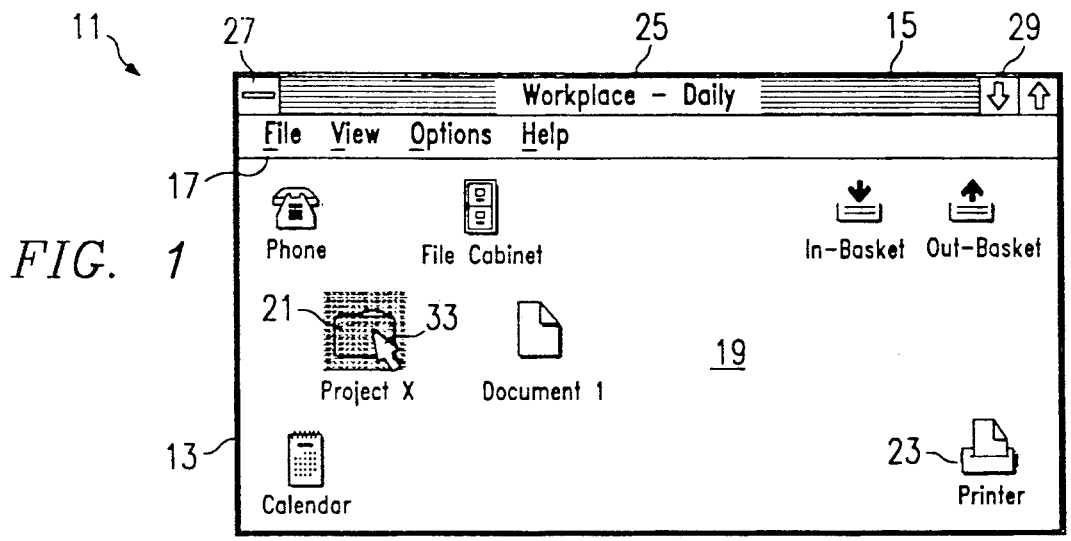
FIG. 1 is a pictorial view of a workplace window.

Referring now to the drawings, and first to FIG. 1, a window is designated generally by the numeral 11. Window 11 includes a border or frame 13 that forms the outer boundary of the window. Contained within border 13 are a title bar 15 and a action bar 17. The remainder of window 11 consists of a client area 19, which is populated with a plurality of icons, including a folder icon 21, which is labeled "Project X", and a printer icon 23.

Title bar 15 includes a window title 25, which identifies the window, a system menu icon 27, and window-sizing icons 29. System menu icon 27 allows the user to display a pull-down menu containing actions that the user can perform on the window. Such actions are related to the window itself and not to the object that is displayed in the window. For example, actions include MOVE, which allows the user to reposition the window on the screen, MINIMIZE, which reduces the window size, and MAXIMIZE, which enlarges the window to the size of the screen. Window-sizing icons 29 provide a fast way to use a mouse or pointing device 33 to perform the actions of MINIMIZE and MAXIMIZE without requiring a menu.

Action bar 17 contains a list of the actions of the application shown in the window. Each action in the list in the action bar has an associated pull-down menu that lists the individual actions that are contained within each general action listed in action bar !7. For example, the FILE pull-down enables the user to work with files through actions that manipulate the file as a whole. The individual actions contained within the FILE action include NEW, which allows users to create a new file, and SAVE, which writes the existing file to a storage device.

Figure 2:
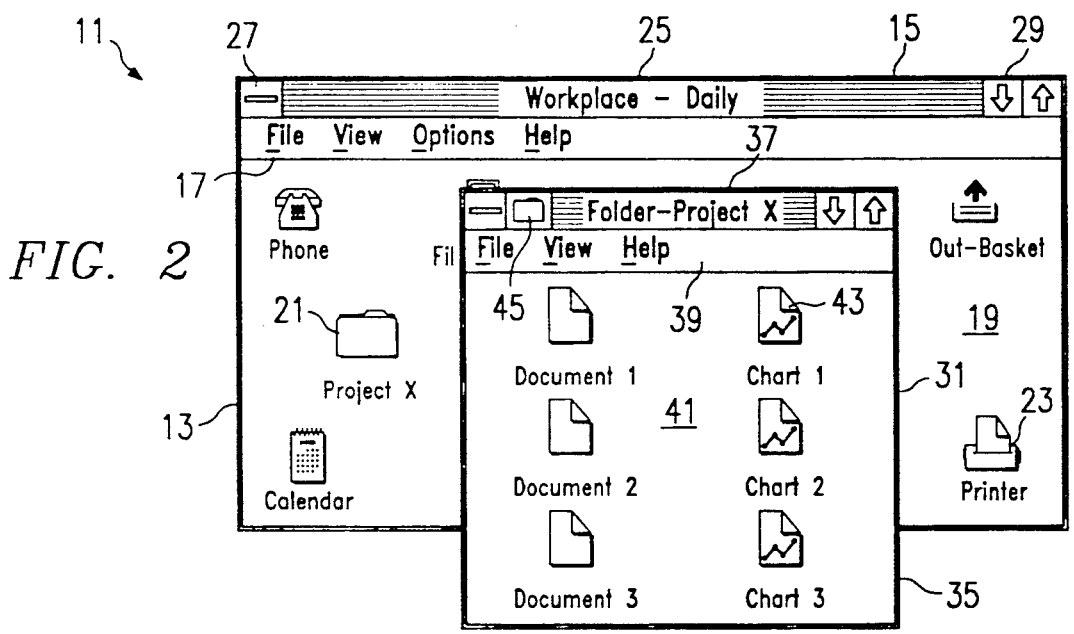
FIG. 2 is a pictorial view similar to FIG. 1 in which the "Project X" folder object has been opened.

Turning to FIG. 2, there is shown in addition to window 11, an object window 31. Object window 31 contains the contents of the "Project X" folder represented by icon 21. Window 31 was opened by operating the pointer 33 to open icon 21.

Window 31 is similar to window 11 in that it includes a frame 35, a title bar 37, an action bar 39, and a client area 41 that is populated with a plurality of document and chart icons, including a "Chart 1" icon 43. Title bar 37 of window 31 includes a title bar mini-icon 45, which is a copy of "Project X" icon 21. Window title bar mini-icon 45 is placed in the title bar, rather than in the client area 41 of window 31, but, as will be explained in greater detail below, window title bar mini-icon 45 may be directly manipulated by the user.

Figure 3:
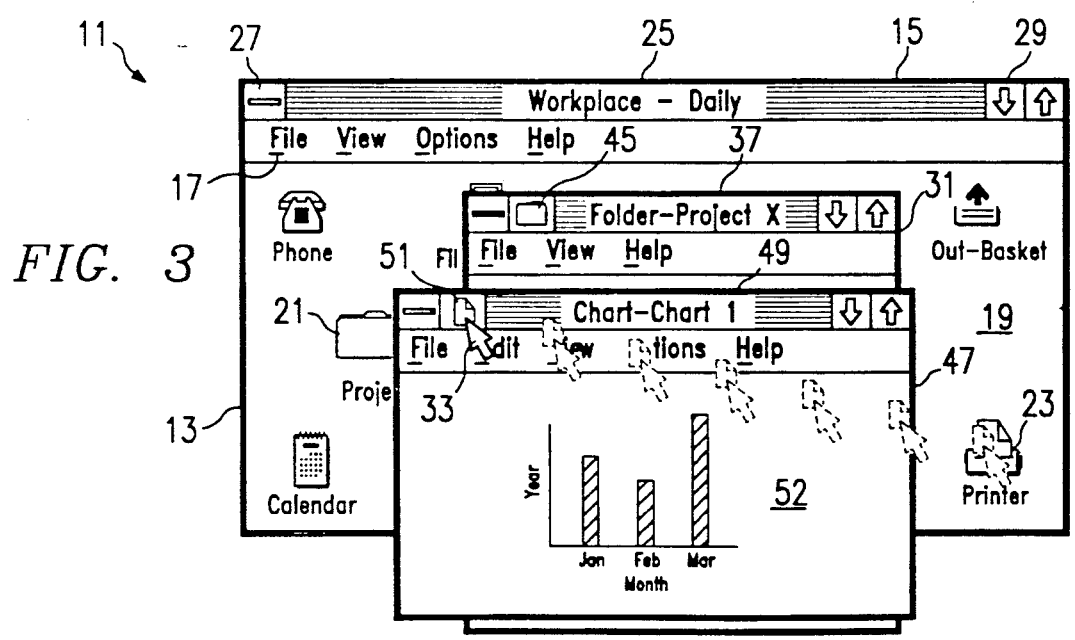
FIG. 3 is a pictorial similar to FIGS. 1 and 2 in which the "Chart 1" object has been opened and which illustrates the direct manipulation of the Chart 1 mini-icon to the printer icon.

Referring now to FIG. 3, there is shown in addition to windows 11 and 31, object window 47 with a client area 52. Object window 47 was opened from the Chart 1 icon 43 in window 31. Object window 47 includes a title bar 49 that has located therein a window title bar mini-icon 51. Window title bar mini-icon 51 is a copy of Chart 1 icon 43 and it represents the contents of window 47 as shown in the client area 52.

Comparing FIGS. 2 and 3, it will be observed that Chart 1 icon 43 of Window 31 is not visible in FIG. 3; it is obscured by object window 47. Thus, Chart 1 icon 43 is not available in FIG. 3 for direct manipulation operations. In order to directly manipulate icon 43 in FIG. 3, it would be necessary to bring it into view either by reducing window 47 to an icon, surfacing window 31, or moving window 47. Each of the foregoing choices involves extra non-intuitive actions on the part of the user. Such actions tend to divert the users attention away from his/her intended task.

In the present invention, window title bar mini-icon 51 is available for direct manipulation. If, as illustrated in FIG. 3, the user desires to print a copy of Chart 1, he/she may do so by dragging window title bar mini-icon 51 to printer icon 23, as illustrated by the sequence of phantom illustrations of window title bar mini-icon 51 and pointer 33. The user is thereby enabled to print Chart 1 without having to find Chart 1 icon 43.

Figure 4:
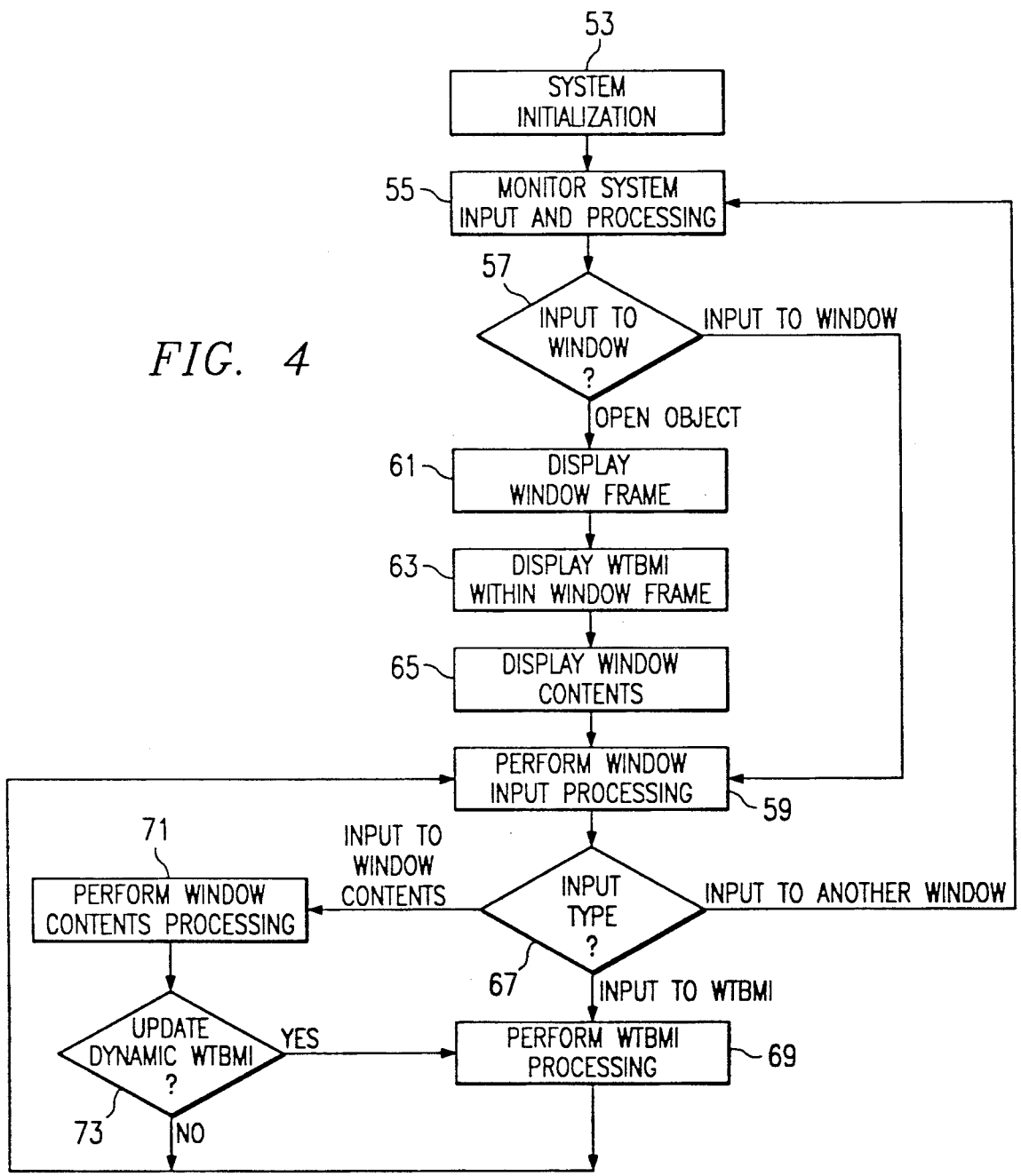
FIG. 4 is a flow chart showing the overall software implementation of the present invention.

Referring now to FIG. 4, there is shown a flowchart of a software implementation of the present invention. In block 53, the system is initialized. After system initialization, the system is monitored for input and processing at block 55. Referring to decision block 57, if the system receives an input to a window, then window input processing is performed at block 59. If, on the other hand, the system receives an order to open an object then the window frame is displayed at block 61, the window title bar mini-icon is displayed within the window frame at block 63 and the window contents are displayed at block 65. Then, window input processing is performed at block 59.

As shown at decision block 67, the action is determined by the input type If the input is to the window title bar mini-icon, then, as shown in block 69, window title bar mini-icon processing is performed, after which the system returns to window input processing at block 59. The window title bar mini-icon is abbreviated as WTBMI in the drawings. As will be shown in greater detail in connection with FIG. 6, window title bar mini-icon processing includes such operations as direct manipulation, updating dynamic window title bar mini-icons, and displaying context menus.

If the input is to the window contents, then window contents processing is performed at block 71. Window contents processing consists essentially of working with the data displayed in the window. Referring to decision block 73, if the processing of the window contents requires updating a dynamic window title bar mini-icon, then the window title bar mini-icon processing is performed at block 69. If no updating is required, then the system returns to block 59 to perform further window input processing.

Finally, if the input is to a window other than the currently active window, the system returns to block 55 to monitor input and processing.

Figure 5:
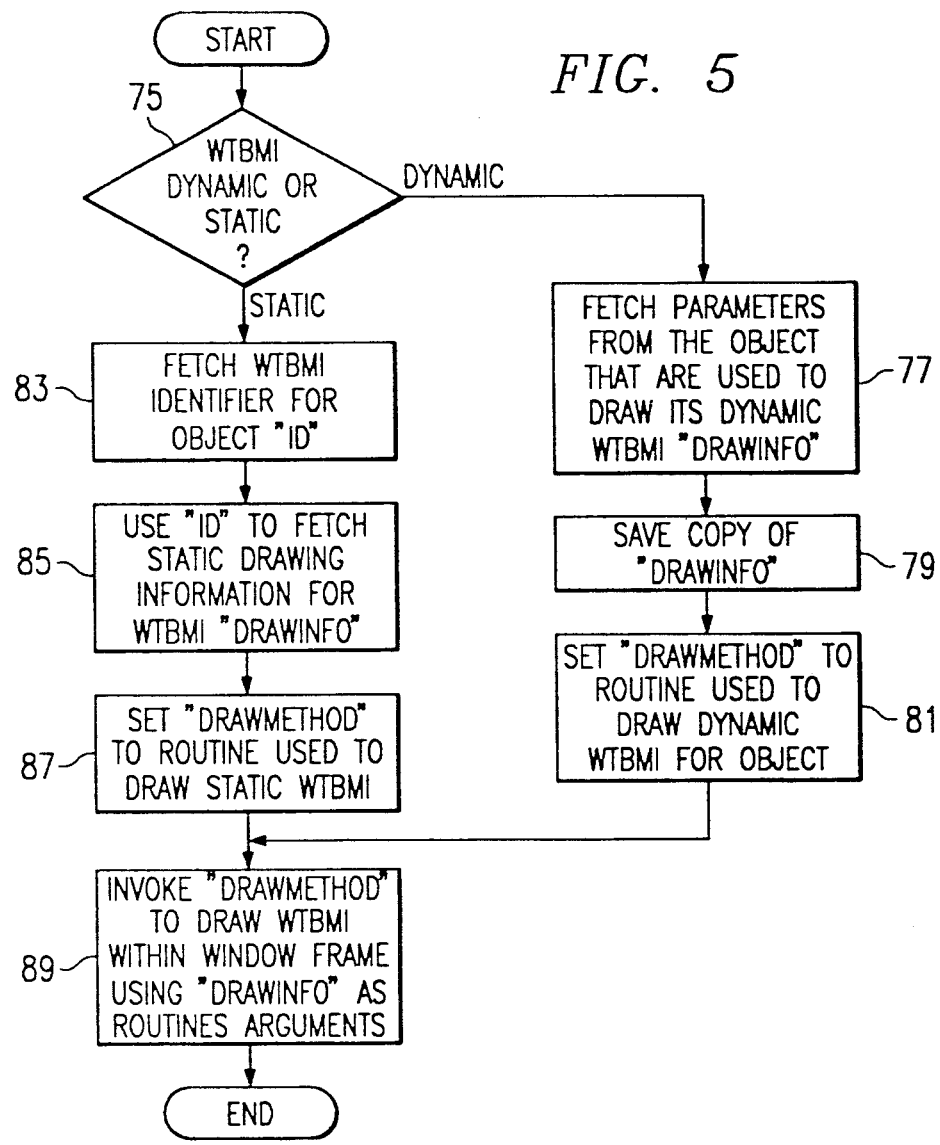
FIG. 5 is a flow chart showing details of the implementation of the "Display WTBMI Within Window Frame" step of FIG. 4.

Referring now to FIG. 5, there is shown details of the steps involved in displaying the window title bar mini-icon within the window frame, which is shown generally at block 63 in FIG. 4. As shown at decision block 75, the window title bar mini-icon may be either dynamic or static. A dynamic window title bar mini-icon is one that changes according to the state of the object. A static mini-icon, on the other hand, maintains its same appearance regardless of the state of the object that it represents.

If the window title bar mini-icon is dynamic, then the parameters that are used to draw the window title bar mini-icon are fetched from the object at block 77. Such parameters are referred to as "DRAWINFO". A copy of the DRAWINFO is saved at block 79 and the DRAWMETHOD is set to the routine used to draw the dynamic window title bar mini-icon for the object at block 81. If, on the other hand, the window title bar mini-icon is static, then a window title bar mini-icon identifier for the object is fetched at block 83. The window title bar mini-icon identifier is referred to as ID. The ID is used to fetch the static drawing information for the window title bar mini-icon at block 85. The static drawing information is referred to as DRAWINFO. Then, the DRAWMETHOD is set to the routine used to draw the static window title bar mini-icon at block 87. After the DRAWMETHOD has been set for either a dynamic or static window title bar mini-icon, DRAWMETHOD routine is invoked to draw the window title bar mini-icon within the window frame using DRAWINFO as the routine's arguments at block 89.

Figure 6:
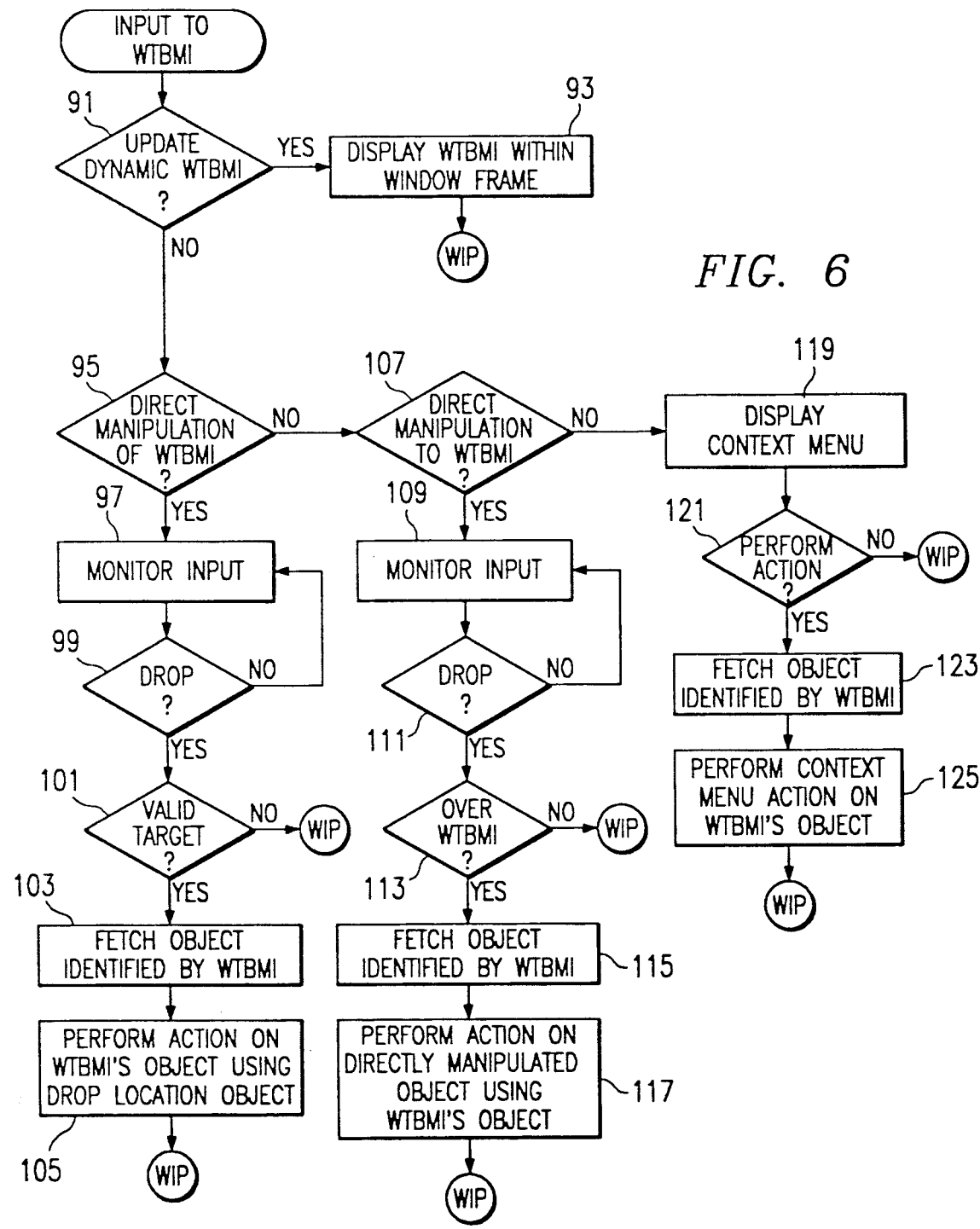
FIG. 6 is a flow chart showing details of the implementation of the "Perform WTBMI Processing" step of FIG. 4.

Referring now to FIG. 6, there is shown details of the implementation of window title bar mini-icon processing, which is referred to generally at block 69 in FIG. 4. If the input to the window title bar mini-icon requires updating a dynamic window title bar mini-icon, as shown at decision block 91, the routine that displays the window title bar mini-icon within the window frame is invoked at block 93 and the system returns to window input processing, FIG. 4 block 59, which is referred to as "WIP" in FIG. 6. It will be recalled that the window title bar mini-icon display routine is shown in detail in FIG. 5.

If the input to the window title bar mini-icon is a direct manipulation of the window title bar mini-icon, as shown at decision block 95, the input is monitored at block 97. In direct manipulation of the window title bar mini-icon, the window title bar mini-icon is dragged to another icon. For example, FIG. 3 shows the direct manipulation of the Chart 1 mini-icon in order to print Chart 1. As shown in decision block 99, the input is monitored until the window title bar mini-icon is dropped. Referring to decision block 10!, if the window title bar mini-icon is dropped over an invalid target, which is one that is not capable of performing a direct manipulation action with the window title bar mini-icons object, the system returns to window input processing. If, however, the window title bar mini-icon is dropped over a valid target, the object identified by the window title bar mini-icon is fetched at block 103 and the action is performed on the window title bar mini-icon's object using the drop location object at block 105. After the action has been performed the system returns to window input processing.

Referring to decision clock 107, if the action involves direct manipulation to the window title bar mini-icon, the input is monitored at block 109. In direct manipulation on the window title bar mini-icon, the window title bar mini-icon is the target icon and another icon is dragged to it. As shown at decision block 111, the input is monitored until the directly manipulated icon is dropped. Referring to decision block 113, if the drop is not over the window title bar mini-icon, then the system returns to window input processing. If, however, the manipulated icon is dropped over the window title bar mini-icon, then the object identified by the window title bar mini-icon is fetched at block 115 and the action on the directly manipulated object using the window title bar mini-icon's object is performed at block 117. After the action has been performed, the system returns to window input processing.

If the input to the window title bar mini-icon is neither dynamic window title bar mini-icon updating nor direct manipulation, then a context menu is displayed at block 119. A context menu is a list of actions that may be applied to the window title bar mini-icon. If, at decision block 121, the user does not select a context menu action, the system returns to window input processing. If the user does select an action, then the object identified by the window title bar mini-icon is fetched at block 123 and the context menu action is performed on the window title bar mini-icon's object at block 125. After the action has been performed, the system returns to window input processing.

Figure 7:
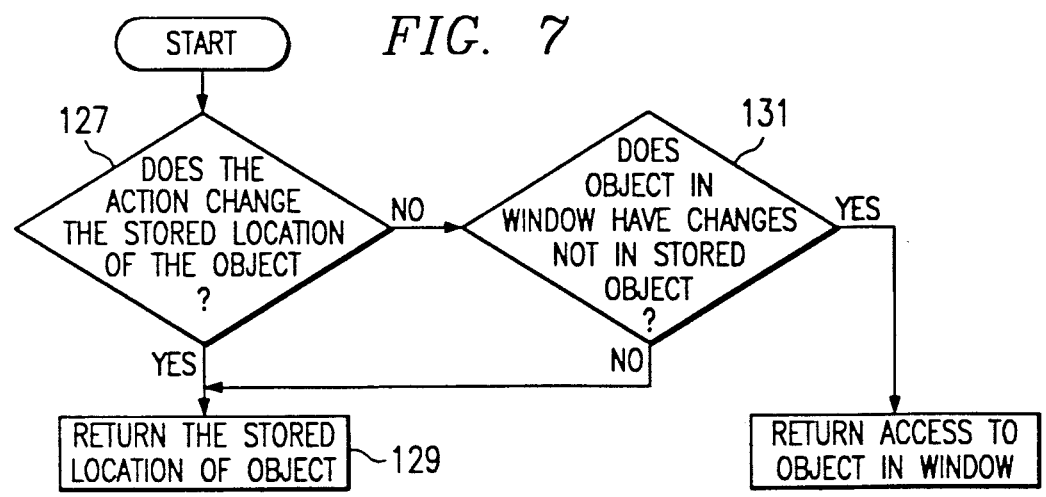
FIG. 7 is a flow chart showing details of the "Fetch Object Identified by WTBMI" step of FIG. 6.

Referring to FIG. 7, there is shown details of the implementation of the "Fetch Object Identified By WTBMI" steps at blocks 103, 115, and 123 of FIG. 6. At decision block 127, the system tests whether the action changes the stored location of the object. If it does, then the stored location of the object is returned at block 129. If the action does not change the stored location of the object, then the system, at decision block 131, tests whether the object in the window has changes not in the stored object. If it does, then the system returns access to the object in the window. If it does not, then the system returns the storage location of the object.

From the foregoing, it may be seen that the present invention provides simplification of the steps and thinking required for a user to perform common interaction scenarios involving opened objects and subsequently working with the object as a whole. The object is now accessible whenever a window on the object is visible. This facilitates direct manipulation, context menus, and other operations. Special actions that work on the entire object in the window are no longer required in action bar user interface systems. Actions previously used for the entire object may now be used to work with selected portions of the object in the window. This support is easily added to existing application windows, without impacting their current user interface. The present invention provides a technique that is easy to learn and use for opening objects and subsequently working with them. The technique is easy to learn because it parallels how users work with regular icons.

While the invention has been particularly shown and described with reference to a preferred embodiment, those skilled in the art will understand that various changes in form and detail may be made without departing from the spirit and scope of the invention.

What is claimed is:

1. A method of operating a computer system that includes a display screen, said method comprising the computer-implemented steps of:
   displaying on said screen at least one object icon;
   displaying an object window on said screen in response to user selection of one of said object icons; and
   displaying in said object window a copy of said selected object icon, said object icon copy being user selectable to perform operations associated with the object.

2. The method as claimed in claim 1, wherein said copy is displayed in a normally unused area of said object window.

3. The method as claimed in claim 1, wherein said object window overlies said object icon.

4. The method as claimed in claim 1, wherein another window overlies said selected object icon.

5. The method as claimed in claim 1, including the step of:
   performing a direct manipulation of said copy.

6. The method as claimed in claim 1, including the step of:
   performing a context menu action on said copy.

7. The method as claimed in claim 1, wherein the object displayed in said object window is stored in memory and including the step of modifying the object displayed in the said object window without updating the stored object.

8. The method as claimed in claim 7, including the step of directly manipulating said copy.

9. The method as claimed in claim 8, wherein said directly manipulating step includes the step of fetching the object displayed in the object window whenever said displayed object is more current than said stored object.

10. In a method of operating a computer system that includes a display screen including the steps of displaying on said screen at least one object icon, selecting an object icon, and displaying an object window on said screen in response to selecting said selected object icon, the improvement which comprises the computer-implemented step of:
    displaying in said object window a copy of said selected object icon, said object icon copy being user selectable to perform operations associated with the object.

11. A computer system, which comprises:
    a display screen;
    means for displaying on said screen at least one object icon;
    means for selecting an object icon;
    means for displaying an object window on said screen in response to selecting said selected object icon; and,
    means for displaying in said object window a copy of said selected object icon, said object icon copy being user selectable to perform operations associated with the object.

12. In a computer system including a display screen, means for displaying on said display screen at least one object icon, means for selecting an object icon, and means for displaying an object window on said display screen in response to selecting said selected object icon, the improvement which comprises:

means for displaying in said object window a copy of said selected object icon, said object icon copy being user selectable to perform operations associated with the object.

13. A method of operating a computer system that includes a display screen, said method comprising the computer-implemented steps of:

displaying on said screen a first window with at least one object icon displayed therein;

displaying an object window on said screen in response to user selection of one of said object icons; and, displaying in said object window a copy of said selected object icon, said object icon copy being user selectable to perform operations associated with the object.

14. The method as claimed in claim 13, including the step of:

closing said first window.

15. The method as claimed in claim 13, including the step of scrolling said first window so that said selected object icon is no longer visible.

16. The method as claimed in claim 13, including the step of resizing said first window so that said selected object icon is no longer visible.